United States Patent
Oh et al.

(10) Patent No.: US 12,294,057 B2
(45) Date of Patent: May 6, 2025

(54) NON-AQUEOUS ELECTROLYTE SOLUTION AND LITHIUM SECONDARY BATTERY INCLUDING THE SAME

(71) Applicant: LG Energy Solution, Ltd., Seoul (KR)

(72) Inventors: Jeong Woo Oh, Daejeon (KR); Yoon Gyo Cho, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/281,466

(22) PCT Filed: Aug. 25, 2022

(86) PCT No.: PCT/KR2022/012763
§ 371 (c)(1),
(2) Date: Sep. 11, 2023

(87) PCT Pub. No.: WO2023/027533
PCT Pub. Date: Mar. 2, 2023

(65) Prior Publication Data
US 2024/0047752 A1  Feb. 8, 2024

(30) Foreign Application Priority Data
Aug. 26, 2021 (KR) .......... 10-2021-0113470

(51) Int. Cl.
*H01M 10/0567* (2010.01)
*H01M 4/38* (2006.01)
*H01M 4/505* (2010.01)
*H01M 4/525* (2010.01)
*H01M 4/583* (2010.01)
*H01M 10/0525* (2010.01)
*H01M 10/0568* (2010.01)
*H01M 10/0569* (2010.01)
*H01M 4/02* (2006.01)

(52) U.S. Cl.
CPC ....... *H01M 10/0568* (2013.01); *H01M 4/386* (2013.01); *H01M 4/505* (2013.01); *H01M 4/525* (2013.01); *H01M 4/583* (2013.01); *H01M 10/0525* (2013.01); *H01M 10/0567* (2013.01); *H01M 10/0569* (2013.01); *H01M 2004/027* (2013.01); *H01M 2004/028* (2013.01); *H01M 2300/004* (2013.01); *H01M 2300/0051* (2013.01)

(58) Field of Classification Search
None
See application file for complete search history.

(56) References Cited

U.S. PATENT DOCUMENTS

| | | | |
|---|---|---|---|
| 2006/0154149 A1 | 7/2006 | Arai et al. | |
| 2018/0057737 A1 | 3/2018 | Kang et al. | |
| 2020/0148710 A1 | 5/2020 | Zhang et al. | |
| 2020/0388882 A1* | 12/2020 | Ji | H01G 9/035 |
| 2021/0234199 A1 | 7/2021 | Won et al. | |
| 2022/0140391 A1 | 5/2022 | Kim et al. | |

FOREIGN PATENT DOCUMENTS

| | | |
|---|---|---|
| JP | 2006164860 A | 6/2006 |
| JP | 6790271 B2 | 11/2020 |
| KR | 20140043662 A | 4/2014 |
| KR | 20190062158 A | 6/2019 |
| KR | 20200105227 A | 9/2020 |
| KR | 102283805 B1 | 8/2021 |
| WO | 1997030119 A1 | 8/1997 |

OTHER PUBLICATIONS

Park, S. et al., "Replacing conventional battery electrolyte additives with dioxolone derivatives for high-energy-density lithium-ion batteries", Nature Communications, Feb. 2021, <https://doi.org/10.1038/s41467-021-21106-6>.
Liu, Y. et al., "Investigation of 4, 5-Dimethyl-1, 3-dioxol-2-one as Additives on the Storage Life of LiNi0.8Co0.15Al0.05O2/Graphite Batteries at Elevated Temperature", Journal of the Electrochemical Society, Dec. 2017, 164 (14), pp. A3949-A3959.
Xu, M et al., "Experimental and theoretical investigations on 4,5-dimethyl-[1,3]dioxol-2-one as solid electrolyte Interface forming additive for lithium-ion batteries", Electrochimica Acta, May 2010, 55, pp. 6743-6748.
International Search Report for Application No. PCT/KR2022/012763 mailed Nov. 30, 2022. 3 pages.

* cited by examiner

*Primary Examiner* — Haixia Zhang
(74) *Attorney, Agent, or Firm* — Lerner David LLP

(57) ABSTRACT

A non-aqueous electrolyte solution has improved high-temperature stability and high-temperature durability and a lithium secondary battery including the same. The non-aqueous electrolyte solution may include a lithium salt; a non-aqueous organic solvent; and a compound represented by Formula 1 of a specific structure:

[Formula 1]

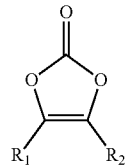

wherein $R_1$ and $R_2$ are described herein.

17 Claims, No Drawings

NON-AQUEOUS ELECTROLYTE SOLUTION AND LITHIUM SECONDARY BATTERY INCLUDING THE SAME

CROSS-REFERENCE TO RELATED APPLICATIONS

This application is a national stage entry under 35 U.S.C. § 371 of International Application No. PCT/KR2022/012763 filed on Aug. 25, 2022, which claims priority from Korean Patent Application No. 10-2021-0113470 filed on Aug. 26, 2021, all the disclosures of which are incorporated by reference herein.

TECHNICAL FIELD

The present invention relates to a non-aqueous electrolyte solution having improved high-temperature stability and high-temperature durability and a lithium secondary battery including the same.

BACKGROUND ART

Demand for high-stability lithium ion secondary batteries is gradually increasing as personal IT devices and computer networks are recently developed with the development of information society and the accompanying dependency of society as a whole on the electrical energy is increased.

A lithium ion secondary battery is a battery system with the highest theoretical energy density among secondary battery technologies, wherein it is advantageous in that it may be applied to various devices and may be miniaturized to be applicable to the personal IT devices.

The lithium ion secondary battery is composed of a positive electrode that includes a positive electrode active material formed of a transition metal oxide containing lithium, a negative electrode formed of a negative electrode active material, such as a carbon-based material, capable of storing lithium, a non-aqueous electrolyte solution that becomes a medium for transferring lithium ions, and a separator.

In the lithium secondary battery, lithium ions from the positive electrode active material, such as a lithium metal oxide, move to the negative electrode active material during initial charge to be intercalated between layers of the negative electrode active material. In this case, since the lithium ion has strong reactivity, an electrolyte solution composition and a material constituting the negative electrode active material react on a surface of the negative electrode active material to form an SEI (Solid Electrolyte Interface) film, a kind of protective film, on the surface of the negative electrode active material.

The SEI film prevents destruction of a negative electrode structure due to intercalation of organic solvent molecules having a large molecular weight, which move together with the lithium ions in the electrolyte solution composition, between the layers of the negative electrode active material. Thus, decomposition of the electrolyte solution composition does not occur because a contact between the electrolyte solution composition and the negative electrode active material is avoided, and an amount of the lithium ions in the electrolyte solution composition is reversibly maintained to maintain stable charge and discharge. Accordingly, an interest in an additive for forming a stable SEI film on a surface of the negative electrode is increasing.

Recently, a silicon-based negative electrode active material, which may achieve high energy density because of its higher theoretical capacity than graphite, has emerged as a component of the negative electrode active material.

However, with respect to the silicon-based negative electrode active material, a serious volume change of active material particles occurs due to repeated charge and discharge and, as a result, cracks in the SEI film formed on the surface of the negative electrode occur. Since a new negative electrode surface is continuously exposed to the electrolyte solution due to these cracks, a thick and unstable film may be formed and the film with an unstable structure may reduce stability, particularly, high-temperature stability.

Therefore, there is a need to develop a non-aqueous electrolyte solution capable of forming a stable SEI film having high-temperature durability instead of an SEI film formed from a conventional carbonate-based organic solvent.

DISCLOSURE OF THE INVENTION

Technical Problem

An aspect of the present invention provides a non-aqueous electrolyte solution capable of forming a stable film on a surface of a silicon-based negative electrode.

Another aspect of the present invention provides a lithium secondary battery in which high-temperature stability and high-temperature durability are improved by including the above non-aqueous electrolyte solution.

Technical Solution

According to an aspect of the present invention, there is provided a non-aqueous electrolyte solution including:
a lithium salt;
a non-aqueous organic solvent; and
a compound represented by Formula 1:

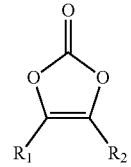

[Formula 1]

In Formula 1,
$R_1$ is an alkyl group having 1 to 5 carbon atoms and optionally substituted with at least one fluorine element, or —$OR_3$ ($R_3$ is an alkyl group having 1 to 5 carbon atoms and optionally substituted with at least one fluorine element), and
$R_2$ is a heterocycloalkenyl group having 2 to 8 carbon atoms and at least one nitrogen atom, or —C(O)—$R_4$ ($R_4$ is a heterocycloalkenyl group having 2 to 8 carbon atoms and at least one nitrogen atom).

According to another aspect of the present invention, there is provided a lithium secondary battery including a positive electrode; a negative electrode; a separator disposed between the positive electrode and the negative electrode; and the non-aqueous electrolyte solution of the present invention.

Advantageous Effects

A compound represented by Formula 1, which is included in a non-aqueous electrolyte solution of the present disclosure, is a compound including at least one nitrogen and optionally a fluorine atom in its structure, wherein the nitrogen atom in the compound may effectively scavenge a Lewis acid generated as an electrolyte decomposition product by acting as a Lewis base, and the fluorine atom may be reductively decomposed to form a stable LiF-containing film on a surface of a negative electrode. Thus, if the non-aqueous electrolyte solution of the present disclosure including the compound of Formula 1 is used, a lithium secondary battery having improved high-temperature stability and high-temperature durability may be achieved while initial resistance satisfies a certain level.

DETAILED DESCRIPTION

Hereinafter, various embodiments of the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Also, the terms used in the present specification are used to merely describe exemplary embodiments, but are not intended to limit the invention. The terms of a singular form may include plural forms unless referred to the contrary.

Before describing the present disclosure, it will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

The expressions "a" and "b" in the description of "a to b carbon atoms" in the specification each denote the number of carbon atoms included in a specific functional group. That is, the functional group may include "a" to "b" carbon atoms. For example, the expression "alkyl group having 1 to 5 carbon atoms" denotes an alkyl group including 1 to 5 carbon atoms, that is, $-CH_3$, $-CH_2CH_3$, $-CH_2CH_2CH_3$, $-CH(CH_3)CH_3$, and $-CH(CH_3)CH_2CH_3$.

Furthermore, unless otherwise defined in the specification, the expression "substitution" denotes that at least one hydrogen bonded to carbon is substituted with an element other than hydrogen, for example, an alkyl group having 1 to 6 carbon atoms or a fluorine.

Non-Aqueous Electrolyte Solution

According to an embodiment, the present invention provides a non-aqueous electrolyte solution.

The non-aqueous electrolyte solution includes:
a lithium salt;
a non-aqueous organic solvent; and
a compound represented by Formula 1 below.

[Formula 1]

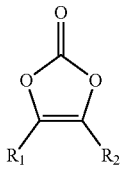

In Formula 1,
$R_1$ is an alkyl group having 1 to 5 carbon atoms and optionally substituted with at least one fluorine element, or $-OR_3$ ($R_3$ is an alkyl group having 1 to 5 carbon atoms and optionally substituted with at least one fluorine element), and
$R_2$ is a heterocycloalkenyl group having 2 to 8 carbon atoms and at least one nitrogen atom, or $-C(O)-R_4$ ($R_4$ is a heterocycloalkenyl group having 2 to 8 carbon atoms and at least one nitrogen atom).

(1) Lithium Salt

First, the lithium salt will be described as follows.

Any lithium salt typically used in an electrolyte solution for a lithium secondary battery may be used as the lithium salt without limitation, and, for example, the lithium salt may include $Li^+$ as a cation, and may include at least one selected from $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, or $SCN^-$ as an anion.

Specifically, the lithium salt may include a single material selected from LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$ (Lithium bis(fluorosulfonyl)imide, LiFSI), $LiN(SO_2CF_2CF_3)_2$ (lithium bis(pentafluoroethanesulfonyl)imide, LiBETI), or $LiN(SO_2CF_3)_2$ (lithium bis(trifluoromethanesulfonyl)imide, LiTFSI) or a mixture of two or more thereof, and a lithium salt typically used in an electrolyte solution of a lithium secondary battery may be used without limitation in addition to the above-described lithium salt. Specifically, the lithium salt may include $LiPF_6$.

The lithium salt may be appropriately changed in a normally usable range, but may be included in a concentration of 0.8 M to 3.0 M, for example, 1.0 M to 3.0 M in the electrolyte solution to obtain an optimum effect of forming a film for preventing corrosion of the surface of the electrode. In a case in which the concentration of the lithium salt satisfies the above range, viscosity of the non-aqueous electrolyte solution may be controlled to achieve optimal impregnatability, and mobility of lithium ions may be improved to obtain an effect of improving capacity characteristics and cycle characteristics of the lithium secondary battery.

(2) Non-Aqueous Organic Solvent

Also, a description of the non-aqueous organic solvent is as follows.

Various organic solvents typically used in a non-aqueous electrolyte solution may be used as the non-aqueous organic solvent without limitation, wherein a type thereof is not limited as long as decomposition due to an oxidation reaction during charge and discharge of the secondary battery may be minimized and desired properties may be exhibited together with an additive.

Specifically, the non-aqueous organic solvent may include a cyclic carbonate-based organic solvent, a linear carbonate-based organic solvent, or a mixed organic solvent thereof.

The cyclic carbonate-based organic solvent is a highly viscous organic solvent which well dissociates the lithium salt in the non-aqueous electrolyte solution due to high permittivity, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

The linear carbonate-based organic solvent is an organic solvent having low viscosity and low permittivity, wherein specific examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

In one embodiment, the non-aqueous organic solvent of the present invention may be used by mixing the cyclic carbonate-based organic solvent and the linear carbonate-based organic solvent in a volume ratio of 10:90 to 80:20, specifically, a volume ratio of 50:50 to 70:30. In a case in which the volume ratio of the cyclic carbonate-based organic solvent to the linear carbonate-based organic solvent satisfies the above range, a non-aqueous electrolyte solution having higher electrical conductivity may be prepared.

Furthermore, the non-aqueous electrolyte solution of the present disclosure may minimize disadvantages of the cyclic carbonate-based organic solvent causing gas generation during high-voltage operation and may simultaneously achieve high ionic conductivity by further including a linear ester-based organic solvent and/or a cyclic ester-based organic solvent which have relatively higher stability during high-temperature and high-voltage operation than the cyclic carbonate-based organic solvent.

As a specific example, the linear ester-based organic solvent may include at least one selected from methyl acetate, ethyl acetate, propyl acetate, methyl propionate, ethyl propionate, propyl propionate, or butyl propionate, and may specifically include at least one of ethyl propionate or propyl propionate.

Also, the cyclic ester-based organic solvent may include at least one selected from γ-butyrolactone, γ-valerolactone, γ-caprolactone, σ-valerolactone, or ε-caprolactone.

A remainder excluding the lithium salt and the compound represented by Formula 1 as an additive in the non-aqueous electrolyte solution of the present disclosure may all be the non-aqueous organic solvent unless otherwise stated.

(3) Compound Represented by Formula 1

The non-aqueous electrolyte solution may include a compound represented by Formula 1 below as an additive.

[Formula 1]

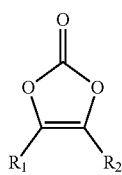

In Formula 1,
R$_1$ is an alkyl group having 1 to 5 carbon atoms and optionally substituted with at least one fluorine element, or —OR$_3$ (R$_3$ is an alkyl group having 1 to 5 carbon atoms and optionally substituted with at least one fluorine element), and R$_2$ is a heterocycloalkenyl group having 2 to 8 carbon atoms and at least one nitrogen atom, or —C(O)—R$_4$ (R$_4$ is a heterocycloalkenyl group having 2 to 8 carbon atoms and at least one nitrogen atom).

A fluorine-containing cyclic carbonate compound as a known material used as a conventional non-aqueous electrolyte solution additive, for example, fluoroethylene carbonate (FEC) represented by the following Formula 2 is also known to form an organic-inorganic composite film.

[Formula 2]

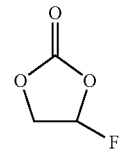

However, since the fluoroethylene carbonate is chemically unstable, it is not only easily decomposed in the presence of a Lewis acid, but also has poor high-temperature stability when used in a secondary battery including a silicon-based negative electrode, and thus, it is disadvantageous in that it is difficult to form a robust film when included as a single additive.

In contrast, since the compound represented by Formula 1, which is used as the additive of the present disclosure, includes a nitrogen atom and optionally a fluorine atom in its structure, it may easily form a robust organic-inorganic composite film containing carbon atoms and nitrogen and optionally fluorine elements, which may secure oxidation resistance, on surfaces of positive electrode and negative electrode, particularly, on a surface of the silicon-based negative electrode during an electrochemical decomposition reaction. That is, since the nitrogen atom in the compound acts as a Lewis salt functional group to scavenge a Lewis acid generated as an electrolyte decomposition product, it may suppress further decomposition of the non-aqueous organic solvent by controlling a solid electrolyte interface (SEI) decomposition reaction. Also, if the fluorine element is included in the structure of the compound represented by Formula 1 of one embodiment of the present invention, SEI properties may be strengthened by forming LiF, which is an SEI film component of the negative electrode, through a reductive decomposition reaction of the compound. Thus, high-temperature stability and high-temperature durability effect of the secondary battery may be achieved by forming a stable SEI on the surface of the silicon-based negative electrode in which SEI instability is intensified by contraction and expansion of the negative electrode.

In Formula 1, R$_1$ is an alkyl group having 1 to 3 carbon atoms and optionally substituted with at least one fluorine element, or —OR$_3$ (R$_3$ is an alkyl group having 1 to 3 carbon atoms and optionally substituted with at least one fluorine element), and R$_2$ is a heterocycloalkenyl group having 2 to 6 carbon atoms and at least one nitrogen atom, or —C(O)—R$_4$ (R$_4$ is a heterocycloalkenyl group having 2 to 6 carbon atoms and at least one nitrogen atom).

Specifically, in Formula 1, $R_1$ may be at least one selected from —$CH_3$, —$CF_3$, —$OCH_3$, or —$OCF_3$, and $R_2$ may be at least one selected from

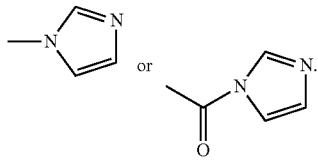

More specifically, the compound represented by Formula 1 may include at least one of compounds represented by Formulae 1-1, 1-2, 1-3, or 1-4 below.

[Formula 1-1]

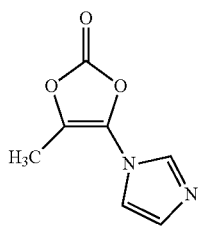

[Formula 1-2]

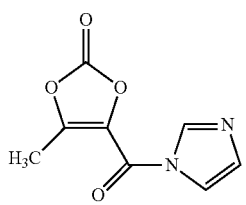

[Formula 1-3]

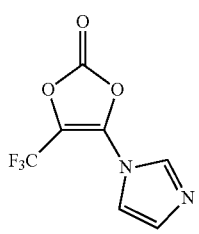

[Formula 1-4]

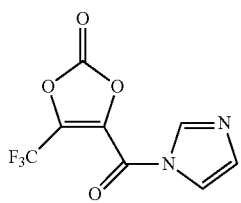

The compound represented by Formula 1 may be included in an amount of 0.1 wt % to 7.0 wt % based on a total weight of the non-aqueous electrolyte solution.

In a case in which the compound represented by Formula 1 is included in the above range, a stable film is formed on the surface of the positive electrode to have a high effect of suppressing dissolution of metal foreign matter from the positive electrode, and gas generation and resulting cell swelling may be prevented by forming a stable film particularly on the surface of the silicon-based negative electrode to effectively suppress a side reaction between the electrode and the electrolyte solution. Thus, the high-temperature stability and high-temperature durability effect of the battery may be further improved.

In a case in which the amount of the compound represented by Formula 1 is 0.1 wt % or more, a stable film is formed, and an effect of scavenging the Lewis acid generated as an electrolyte decomposition product during battery operation may be more stably maintained at the same time. Also, in a case in which the amount of the compound represented by Formula 1 is 7.0 wt % or less, since mobility of ions in the battery may be improved while preventing an increase in viscosity of the electrolyte solution due to the surplus compound and an increase in battery resistance may be effectively prevented by suppressing excessive formation of the film, degradation of capacity and cycle characteristics may be prevented.

Specifically, the compound represented by Formula 1 may be included in an amount of 0.5 wt % to 5.0 wt %, particularly wt % to 3.0 wt %, and more particularly 1.0 wt % to 3.0 wt % based on the total weight of the non-aqueous electrolyte solution.

(4) Other Additives

Also, the non-aqueous electrolyte solution of one embodiment of the present invention may further include additional other additives in order to prevent the occurrence of collapse of the negative electrode due to the decomposition of the non-aqueous electrolyte solution in a high power environment or to further improve low-temperature high rate discharge characteristics, high-temperature stability, overcharge prevention, and an effect of suppressing battery swelling at high temperature.

Examples of the other additives may be at least one selected from the group consisting of a cyclic carbonate-based compound, a halogen-substituted carbonate-based compound, a sultone-based compound, a sulfate-based compound, a phosphate-based or phosphite-based compound, a borate-based compound, a benzene-based compound, an amine-based compound, a silane-based compound, and a lithium salt-based compound.

The cyclic carbonate-based compound may include vinylene carbonate (VC) or vinyl ethylene carbonate (VEC).

The halogen-substituted carbonate-based compound may include fluoroethylene carbonate (FEC).

The sultone-based compound, for example, may be at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may be ethylene sulfate (Esa), trimethylene sulfate (TMS), or methyl trimethylene sulfate (MTMS).

The phosphate-based or phosphite-based compound, for example, may be at least one compound selected from the group consisting of lithium difluoro(bisoxalato)phosphate, lithium difluorophosphate, tris(trimethylsilyl)phosphate, tris(trimethylsilyl)phosphite, tris(2,2,2-trifluoroethyl)phosphate, and tris(trifluoroethyl)phosphite.

The borate-based compound may include tetraphenylborate, lithium oxalyldifluoroborate (LiODFB) or lithium bis(oxalato)borate ($LiB(C_2O_4)_2$, LiBOB) which may form a film on the surface of the negative electrode.

The benzene-based compound may be fluorobenzene, and the amine-based compound may be triethanolamine or ethylenediamine.

The silane-based compound may be tetravinylsilane.

The lithium salt-based compound is a compound different from the lithium salt included in the non-aqueous electrolyte solution, wherein the lithium salt-based compound may include $LiPO_2F_2$ or $LiBF_4$.

Among these other additives, in order to form a more robust SEI film on the surface of the negative electrode during an initial activation process, other additives with an excellent film-forming effect on the surface of the negative electrode, specifically, at least one selected from vinylene carbonate, vinylethylene carbonate, fluoroethylene carbonate (FEC), or lithium oxalyldifluoroborate (LiODFB) may be included.

Two or more compounds may be mixed and used as the other additives, and the other additives may be included in an amount of 0.01 wt % to 50 wt %, particularly 0.01 wt % to 10 wt %, and preferably 0.05 wt % to 5 wt % based on the total weight of the non-aqueous electrolyte solution. In a case in which the amount of the other additives is within the above range, it is desirable because the cycle characteristics may be improved, a side reaction of the battery due to excessive addition may be prevented, and residue or precipitation of unreacted material may be prevented.

Lithium Secondary Battery

Also, another embodiment of the present invention provides a lithium secondary battery including a positive electrode; a negative electrode; a separator disposed between the positive electrode and the negative electrode; and the above-described non-aqueous electrolyte solution of the present invention.

After an electrode assembly, in which a positive electrode, a separator, and a negative electrode are sequentially stacked, is formed and accommodated in a battery case, the lithium secondary battery of the present disclosure may be prepared by injecting the non-aqueous electrolyte solution of the present disclosure.

The lithium secondary battery of the present disclosure may be prepared according to a conventional method known in the art and used, and a method of preparing the lithium secondary battery of the present invention specifically is the same as described below.

(1) Positive Electrode

The positive electrode according to the present disclosure may include a positive electrode active material layer including a positive electrode active material, and, if necessary, the positive electrode active material layer may further include a conductive agent and/or a binder.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum.

Specifically, the positive electrode active material may include lithium-cobalt-based oxide (e.g., $LiCoO_2$, etc.), lithium-manganese-based oxide (e.g., $LiMnO_2$, $LiMn_2O_4$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), etc.), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), titanium (Ti), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the positive electrode active material may include at least one selected from lithium-cobalt oxide, lithium-manganese-based oxide, lithium-nickel-manganese-cobalt-based oxide, or lithium-nickel-cobalt-transition metal (M) oxide, and may preferably include at least one selected from a lithium-nickel-manganese-cobalt-based oxide having a nickel content of 55 atm % or more or a lithium-nickel-cobalt-transition metal (M) oxide having a nickel content of 55 atm % or more.

Specifically, as a representative example, the positive electrode active material may include at least one selected from $Li(Ni_{1/3}Mn_{1/3}Co_{1/3})O_2$, $Li(Ni_{0.6}Mh_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or $Li(Ni_{0.86}Co_{0.05}Mn_{0.07}Al_{0.02})O_2$, and may preferably include $Li(Ni_{0.7}Mn_{0.15}Co_{0.15})O_2$, $Li(Ni_{0.8}Mn_{0.1}Co_{0.1})O_2$, or $Li(Ni_{0.86}Co_{0.05}Mn_{0.07}Al_{0.02})O_2$.

The positive electrode active material may be included in an amount of 80 wt % to 99 wt %, for example, 90 wt % to 99 wt % based on a total weight of a solid content in a positive electrode slurry. In this case, when the amount of the positive electrode active material is 80 wt % or less, since energy density is reduced, capacity may be reduced.

The conductive agent is not particularly limited as long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, or nickel powder; conductive whiskers such as zinc oxide whiskers or potassium titanate whiskers; conductive metal oxide such as titanium oxide; or polyphenylene derivatives, may be used.

The conductive agent may commonly be added in an amount of 1 wt % to 30 wt % based on a total weight of a solid content in the positive electrode active material layer.

The binder is a component that improves the adhesion between positive electrode active material particles and the adhesion between the positive electrode active material and a current collector, wherein the binder is commonly added in an amount of 1 wt % to 30 wt % based on the total weight of the solid content in the positive electrode active material layer. Examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

The positive electrode of the present disclosure as described above may be prepared according to a method of preparing a positive electrode which is known in the art. For example, the positive electrode may be prepared by a method in which a positive electrode collector is coated with a positive electrode slurry, which is prepared by dissolving or dispersing the positive electrode active material, the binder, and/or the conductive agent in a solvent and then dried and rolled to form a positive electrode active material layer, or a method in which the positive electrode active material layer is cast on a separate support, and a film separated from the support is then laminated on the positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The solvent may include an organic solvent, such as N-methyl-2-pyrrolidone (NMP), and may be used in an amount such that desirable viscosity is obtained when the positive electrode active material as well as optionally the binder and the conductive agent is included. For example, the solvent may be included in an amount such that a concentration of the solid content in the active material slurry including the positive electrode active material as well as optionally the binder and the conductive agent is in a range of 10 wt % to 70 wt %, preferably, 20 wt % to 60 wt %.

(2) Negative Electrode

Next, a negative electrode will be described.

The negative electrode according to the present disclosure includes a negative electrode active material layer including a negative electrode active material, and the negative electrode active material layer may further include a conductive agent and/or a binder, if necessary.

Various negative electrode active materials used in the art, for example, a carbon-based negative electrode active material capable of reversibly intercalating/deintercalating lithium ions, a silicon-based negative electrode active material which may be doped and undoped with lithium, or a mixture thereof may be used as the negative electrode active material.

The carbon-based negative electrode active material may be used without particular limitation, and, as a representative example thereof, a graphite-based material such as natural graphite, artificial graphite, or Kish graphite; pyrolytic carbon, mesophase pitch based carbon fiber, meso-carbon microbeads, mesophase pitches, high-temperature sintered carbon such as petroleum or coal tar pitch derived cokes, soft carbon, or hard carbon may be used. A shape of the carbon-based negative electrode active material is not particularly limited, and materials of various shapes, such as an irregular shape, planar shape, flaky shape, spherical shape, or fibrous shape, may be used.

Preferably, the carbon-based negative electrode active material may include at least one of natural graphite or artificial graphite. More preferably, the carbon-based negative electrode active material may include natural graphite and artificial graphite. In a case in which the natural graphite and the artificial graphite are used together, adhesion with a current collector may be increased to suppress exfoliation of the active material.

According to another embodiment, the negative electrode active material may include a silicon-based negative electrode active material, and the silicon-based negative electrode active material, for example, may include at least one selected from metallic silicon (Si), silicon oxide ($SiO_x$, where $0<x<2$), silicon carbide (SiC), or a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, calcium (Ca), strontium (Sr), barium (Ba), radium (Ra), scandium (Sc), yttrium (Y), Ti, zirconium (Zr), hafnium (Hf), rutherfordium (Rf), V, niobium (Nb), Ta, dubnium (Db), Cr, Mo, tungsten (W), seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), Al, gallium (Ga), tin (Sn), indium (In), Ti, germanium (Ge), phosphorus (P), arsenic (As), antimony (Sb), bismuth (Bi), sulfur (S), selenium (Se), tellurium (Te), polonium (Po), and a combination thereof.

Since the silicon-based negative electrode active material has higher capacity characteristics than the carbon-based negative electrode active material, better capacity characteristics may be obtained when the silicon-based negative electrode active material is further included.

According to another embodiment, the negative electrode active material in the present invention may include a mixture of a carbon-based negative electrode active material and a silicon-based negative electrode active material.

Specific examples of the carbon-based negative electrode active material and the silicon-based negative electrode active material are the same as described above.

A mixing ratio of the silicon-based negative electrode active material to the carbon-based negative electrode active material may be in a range of 3:97 to 99:1, preferably 5:95 to and more preferably 5:95 to 15:85, as a weight ratio. In a case in which the mixing ratio of the silicon-based negative electrode active material to the carbon-based negative electrode active material satisfies the above range, since a volume expansion of the silicon-based negative electrode active material is suppressed while capacity characteristics are improved, excellent cycle performance may be secured.

At least one selected from lithium metal; transition metal oxides, such as lithium-containing titanium composite oxide (LTO), vanadium oxide, or lithium vanadium oxide; or common metal composite oxides may be used as the negative electrode active material without particular limitation in addition to the carbon-based negative electrode active material or the silicon-based negative electrode active material.

The negative electrode active material may be included in an amount of 80 wt % to 99 wt % based on a total weight of a solid content in a negative electrode slurry.

The conductive agent is a component for further improving conductivity of the negative electrode active material, wherein the conductive agent may be added in an amount of 1 wt % to 20 wt % based on a total weight of a solid content in the negative electrode active material layer. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, or thermal black; conductive fibers such as carbon fibers or metal fibers; metal powder such as fluorocarbon powder, aluminum powder, or nickel powder; conductive whiskers such as zinc oxide whiskers or potassium titanate whiskers; conductive metal oxide such as titanium oxide; or polyphenylene derivatives, may be used.

The binder is a component that assists in the binding between the conductive agent, the active material, and the current collector, wherein the binder is commonly added in an amount of 1 wt % to 30 wt % based on the total weight of the solid content in the negative electrode active material layer. Examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; or a silane-based binder.

The negative electrode may be prepared according to a method of preparing a negative electrode which is known in the art. For example, the negative electrode may be prepared by a method in which a negative electrode collector is coated with a negative electrode active material slurry, which is prepared by dissolving or dispersing the negative electrode active material as well as optionally the binder and the conductive agent in a solvent, rolled and dried to form a negative electrode active material layer, or may be prepared by casting the negative electrode active material layer on a separate support and then laminating a film separated from the support on the negative electrode collector.

The negative electrode collector generally has a thickness of 3 μm to 500 μm. The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, or an aluminum-cadmium alloy may be used. Also, similar to the positive electrode collector, microscopic irregularities may be formed on the surface of the collector to improve the adhesion of the negative electrode active material, and the negative electrode collector may be used in various shapes such as that of a film, a sheet, a foil, a net, a porous body, a foam body, a non-woven fabric body, and the like.

The solvent may include water or an organic solvent, such as NMP and alcohol, and may be used in an amount such that desirable viscosity is obtained when the negative electrode active material as well as optionally the binder and the conductive agent is included. For example, the solvent may be included in an amount such that a concentration of the solid content in the active material slurry including the negative electrode active material as well as optionally the binder and the conductive agent is in a range of 50 wt % to 75 wt %, for example, 50 wt % to 65 wt %.

(3) Separator

As the separator included in the lithium secondary battery of the present disclosure, a conventional porous polymer film commonly used, for example, a porous polymer film prepared from a polyolefin-based polymer, such as an ethylene homopolymer, a propylene homopolymer, an ethylene/butene copolymer, an ethylene/hexene copolymer, or an ethylene/methacrylate copolymer, may be used alone or in a lamination therewith as the separator, and a typical porous nonwoven fabric, for example, a nonwoven fabric formed of high melting point glass fibers or polyethylene terephthalate fibers may be used, but the present invention is not limited thereto.

It is desirable that initial resistance of the lithium secondary battery of one embodiment of the present invention is 8 mohm or less. That is, if the initial resistance of the secondary battery is greater than 8 mohm, a problem of intensifying degradation occurs when verifying long-term lifetime after 800 cycles. Thus, it is desirable that the initial resistance of the final product prepared satisfies a level of 8 mohm or less.

A shape of the lithium secondary battery of the present disclosure is not particularly limited, but a cylindrical type using a can, a prismatic type, a pouch type, or a coin type may be used.

Hereinafter, various embodiments of the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

Non-Aqueous Electrolyte Solution Preparation

After $LiPF_6$ was dissolved in a non-aqueous organic solvent, in which ethylene carbonate (EC):ethyl methyl carbonate (EMC) were mixed in a volume ratio of 30:70, such that a concentration of the $LiPF_6$ was 1.0 M, a non-aqueous electrolyte solution was prepared by adding 0.5 wt % of the compound represented by Formula 1-1 and 0.5 wt % of fluoroethylene carbonate (see Table 1 below).

Secondary Battery Preparation

A positive electrode active material (Li($Ni_{0.86}Co_{0.05}Mn_{0.07}Al_{0.02}$)$O_2$), a conductive agent (carbon black), and a binder (polyvinylidene fluoride) were added in a weight ratio of 97.5:1:1.5 to N-methyl-2-pyrrolidone (NMP) to prepare a positive electrode slurry (solid content: 50 wt %). A 12 μm thick aluminum (Al) thin film, as a positive electrode collector, was coated with the positive electrode slurry, dried, and then roll-pressed to prepare a positive electrode.

A negative electrode active material (artificial graphite: SiO=95:5 weight ratio), a binder (SBR-CMC), and a conductive agent (carbon black) were added to water, as a solvent, in a weight ratio of 95:3.5:1.5 to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

After an electrode assembly was prepared by sequentially stacking the positive electrode, a polyolefin-based porous separator coated with inorganic particles ($Al_2O_3$), and the negative electrode, the electrode assembly was accommodated in a pouch-type battery case, and the non-aqueous electrolyte solution for a lithium secondary battery of Example 1 was injected to prepare a pouch-type lithium secondary battery with an operating voltage of 4.45 V or more.

Example 2

A non-aqueous electrolyte solution and a lithium secondary battery were prepared in the same manner as in Example 1 except that, after $LiPF_6$ was dissolved in a non-aqueous organic solvent such that a concentration of the $LiPF_6$ was 1.0 M, the non-aqueous electrolyte solution was prepared by adding 3.0 wt % of the compound represented by Formula 1-1 and 0.5 wt % of fluoroethylene carbonate (see Table 1 below).

Example 3

A non-aqueous electrolyte solution and a lithium secondary battery were prepared in the same manner as in Example 1 except that, after $LiPF_6$ was dissolved in a non-aqueous organic solvent such that a concentration of the $LiPF_6$ was 1.0 M, the non-aqueous electrolyte solution was prepared by adding 5.0 wt % of the compound represented by Formula 1-1 and 0.5 wt % of fluoroethylene carbonate (see Table 1 below).

Example 4

A non-aqueous electrolyte solution and a lithium secondary battery were prepared in the same manner as in Example 1 except that, after $LiPF_6$ was dissolved in a non-aqueous organic solvent such that a concentration of the $LiPF_6$ was 1.0 M, the non-aqueous electrolyte solution was prepared by adding 6.0 wt % of the compound represented by Formula 1-1 and 0.5 wt % of fluoroethylene carbonate (see Table 1 below).

Example 5

A non-aqueous electrolyte solution and a lithium secondary battery were prepared in the same manner as in Example 1 except that the non-aqueous electrolyte solution was prepared by adding the compound represented by Formula 1-2 instead of the compound represented by Formula 1-1 (see Table 1 below).

Example 6

A non-aqueous electrolyte solution and a lithium secondary battery were prepared in the same manner as in Example 3 except that the non-aqueous electrolyte solution was prepared by adding the compound represented by Formula 1-2 instead of the compound represented by Formula 1-1 (see Table 1 below).

Comparative Example 1

After $LiPF_6$ was dissolved in a non-aqueous organic solvent, in which ethylene carbonate (EC):ethyl methyl carbonate (EMC) were mixed in a volume ratio of 30:70, such that a concentration of the $LiPF_6$ was 1.0 M, a non-aqueous electrolyte solution was prepared by adding 0.5 wt % of fluoroethylene carbonate (see Table 1 below).

Secondary Battery Preparation

A non-aqueous electrolyte solution and a lithium secondary battery were prepared in the same manner as in Example 1 except that the above-prepared non-aqueous electrolyte solution, instead of the non-aqueous electrolyte solution of Example 1, was added (see Table 1 below).

Comparative Example 2

A non-aqueous electrolyte solution and a lithium secondary battery were prepared in the same manner as in Example 1 except that the non-aqueous electrolyte solution was prepared by adding a compound represented by Formula 3 instead of the compound represented by Formula 1-1 (see Table 1 below).

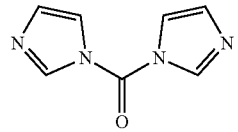

[Formula 3]

Comparative Example 3

A non-aqueous electrolyte solution and a lithium secondary battery were prepared in the same manner as in Example 1 except that the non-aqueous electrolyte solution was prepared by adding a compound represented by Formula 4 below instead of the compound represented by Formula 1-1 (see Table 1 below).

[Formula 4]

TABLE 1

| | | | Additive | | Other additives | |
| | Positive electrode | Negative electrode | Formula | Amount (wt %) | Type | Amount (wt %) |
| --- | --- | --- | --- | --- | --- | --- |
| Example 1 | NCMA | Si negative electrode | 1-1 | 0.5 | FEC | 0.5 |
| Example 2 | | | 1-1 | 3.0 | | |
| Example 3 | | | 1-1 | 5.0 | | |
| Example 4 | | | 1-1 | 6.0 | | |
| Example 5 | | | 1-2 | 0.5 | | |
| Example 6 | | | 1-2 | 5.0 | | |
| Comparative Example 1 | | | — | — | | |
| Comparative Example 2 | | | Formula 3 | 0.5 | | |
| Comparative Example 3 | | | Formula 4 | 0.5 | | |

EXPERIMENTAL EXAMPLES

Experimental Example 1. Initial Resistance Evaluation

After each of the lithium secondary batteries prepared in Examples 1 to 6 and the lithium secondary batteries prepared in Comparative Examples 2 and 3 was charged at 0.33 C rate to 4.2 V under a constant current/constant voltage condition at room temperature (25° C.), each lithium secondary battery was discharged to a DOD (depth of discharge) of 50% to adjust a state of charge (SOC) to 50% and then discharged at 2.5 C rate for 10 seconds, and initial resistance was measured using PNE-0506 charge/discharge equipment (manufacturer: PNE solution). The results thereof are listed in Table 2 below.

TABLE 2

|  | Initial resistance (mohm) |
| --- | --- |
| Example 1 | 5.24 |
| Example 2 | 6.12 |
| Example 3 | 6.57 |
| Example 4 | 8.14 |
| Example 5 | 4.12 |
| Example 6 | 5.97 |
| Comparative Example 2 | 10.24 |
| Comparative Example 3 | 11.69 |

Referring to Table 2, it may be understood that initial resistances of the secondary batteries of Examples 1 to 3, 5, and 6 of the present disclosure were about 6.57 mohm or less. In contrast, with respect to the secondary batteries of Comparative Example 2 including the compound represented by Formula 3 and Comparative Example 3 including the compound represented by Formula 4, it may be understood that initial resistances were significantly increased in comparison to those of the secondary batteries of Examples 1 to 6.

With respect to the secondary battery of Example 4 including the non-aqueous electrolyte solution containing a relatively large amount of the additive, it may be understood that an initial resistance level was slightly increased in comparison to those of the secondary batteries of Examples 1 to 3, 5, and 6.

Experimental Example 2. High-temperature Cycle Characteristics Evaluation

That each of the lithium secondary batteries prepared in Examples 1 to 3, 5, and 6 and Comparative Examples 1 to 3 was charged at 0.33 C rate to 4.2 V under a constant current/constant voltage condition at 45° C. and then discharged at 0.33 C rate under a constant current condition to 3 V was defined as one cycle and capacity retention (%) and resistance increase rate (%) were measured after 200 cycles of charge and discharge were performed. The capacity retention (%) was calculated according to [Equation 1] below, and the resistance increase rate (%) was calculated according to [Equation 2] below. Measurement results are listed in Table 3 below.

Capacity retention (%)=(discharge capacity after 200 cycles/discharge capacity after 1 cycle)×100  [Equation 1]

Resistance increase rate (%)={(resistance after 200 cycles−resistance after 1 cycle)/resistance after 1 cycle}×100  [Equation 2]

TABLE 3

|  | Capacity retention (%) after 200 cycles | Resistance increase rate (%) after 200 cycles |
| --- | --- | --- |
| Example 1 | 90.7 | 5.47 |
| Example 2 | 91.4 | 4.35 |
| Example 3 | 92.4 | 3.71 |
| Example 5 | 90.2 | 6.31 |
| Example 6 | 91.8 | 4.24 |
| Comparative Example 1 | 64.2 | 31.7 |
| Comparative Example 2 | 71.5 | 24.5 |
| Comparative Example 3 | 73.1 | 21.3 |

Referring to Table 3, with respect to the secondary battery of Comparative Example 1 not including the electrolyte solution additive of the present disclosure and the secondary batteries of Comparative Example 2 including the compound represented by Formula 3 and Comparative Example 3 including the compound represented by Formula 4, it may be understood that both capacity retention (%) and resistance increase rate (%) after 200 cycles were deteriorated in comparison to those of the secondary batteries of Examples 1 to 3, 5, and 6.

In contrast, it may be understood that capacity retentions (%) after 200 cycles of the secondary batteries of Examples 1 to 3, 5, and 6 of the present disclosure were about or more, and resistance increase rates (%) were improved to about 6.31% or less. That is, with respect to the secondary batteries of Examples 1 to 3, 5, and 6 of the present disclosure, since a more stable film was formed by the additive, the SEI film, which was additionally decomposed during operation, was reinforced to suppress capacity degradation rate and resistance increase rate due to additional decomposition of the non-aqueous organic solvent, and thus, an improved effect may be achieved.

Experimental Example 3. Volume Increase Rate Evaluation After High-temperature Storage After each of the lithium secondary batteries prepared in Examples 1 to 6 and the lithium secondary batteries prepared in Comparative Examples 1 to 3 was charged at 0.33 C rate to 4.2 V under a constant current/constant voltage condition at room temperature (25° C.), each lithium secondary battery was discharged to a DOD (depth of discharge) of 50% to adjust a SOC to 50% and discharged at 2.5 C rate for 10 seconds, and an initial thickness was then measured.

Then, after each lithium secondary battery was stored at 60° C. for 2 weeks, a thickness after high-temperature storage of each lithium secondary battery was measured, and the results thereof are listed in Table 4 below.

TABLE 4

|  | Volume increase rate (%) |
| --- | --- |
| Example 1 | 17.4 |
| Example 2 | 15.2 |
| Example 3 | 13.4 |
| Example 4 | 13.1 |
| Example 5 | 19.4 |
| Example 6 | 15.2 |
| Comparative Example 1 | 45.9 |
| Comparative Example 2 | 34.8 |
| Comparative Example 3 | 32.1 |

Referring to Table 4, with respect to the secondary batteries of Examples 1 to 6 of the present disclosure, it may be understood that volume increase rates (%) after high-temperature storage were improved in comparison to those of the secondary batteries of Comparative Examples 1 to 3.

The invention claimed is:
1. A non-aqueous electrolyte solution comprising:
a lithium salt;
a non-aqueous organic solvent; and
a compound represented by Formula 1:

[Formula 1]

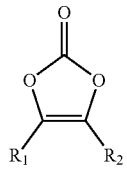

wherein, in Formula 1,
R₁ is an alkyl group having 1 to 5 carbon atoms optionally substituted with at least one fluorine, or —OR₃, wherein R₃ is an alkyl group having 1 to 5 carbon atoms and optionally substituted with at least one fluorine, and
R₂ is

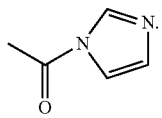

2. The non-aqueous electrolyte solution of claim 1, wherein, in Formula 1,
R₁ is an alkyl group having 1 to 3 carbon atoms and optionally substituted with at least one fluorine, or —OR₃, wherein R₃ is an alkyl group having 1 to 3 carbon atoms and optionally substituted with at least one fluorine.

3. The non-aqueous electrolyte solution of claim 1, wherein, in Formula 1,
R₁ is at least one selected from —CH₃, CF₃, —OCH₃, or OCF₃.

4. The non-aqueous electrolyte solution of claim 1, wherein the compound represented by Formula 1 is at least one of compounds represented by Formulae 1-2, or 1-4:

[Formula 1-2]

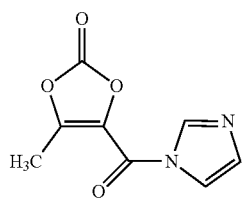

[Formula 1-4]

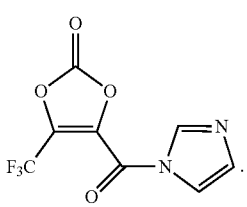

5. The non-aqueous electrolyte solution of claim 1, wherein the compound represented by Formula 1 is included in an amount of 0.1 wt % to 7.0 wt % based on a total weight of the non-aqueous electrolyte solution.

6. The non-aqueous electrolyte solution of claim 1, wherein the compound represented by Formula 1 is included in an amount of 0.5 wt % to 5.0 wt % based on a total weight of the non-aqueous electrolyte solution.

7. The non-aqueous electrolyte solution of claim 1, wherein the lithium salt comprises LiCl, LiBr, LiI, LiBF₄, LiClO₄, LiB₁₀Cl₁₀, LiAlCl₄, LiAlO₄, LiPF₆, LiCF₃SO₃, LiCH₃CO₂, LiCF₃CO₂, LiAsF₆, LiSbF₆, LiCH₃SO₃, LiN(SO₂F)₂, LiN(SO₂CF₂CF₃)₂, LiN(SO₂CF₃)₂, or a mixture thereof.

8. The non-aqueous electrolyte solution of claim 1, wherein the lithium salt is included in a concentration of 0.8 M to 3.0 M in the non-aqueous electrolyte solution.

9. The non-aqueous electrolyte solution of claim 1, wherein the non-aqueous organic solvent comprises a cyclic carbonate-based organic solvent, a linear carbonate-based organic solvent, or a mixed organic solvent thereof.

10. The non-aqueous electrolyte solution of claim 1, further comprising at least one additive selected from a cyclic carbonate-based compound, a halogen-substituted carbonate-based compound, a sultone-based compound, a sulfate-based compound, a phosphate-based or phosphite-based compound, a borate-based compound, a benzene-based compound, an amine-based compound, a silane-based compound, or a lithium salt-based compound.

11. The non-aqueous electrolyte solution of claim 1, further comprising at least one selected from vinylene carbonate, vinylethylene carbonate, fluoroethylene carbonate, or lithium oxalyldifluoroborate.

12. The non-aqueous electrolyte solution of claim 10, wherein the at least one additive is included in an amount of 0.01 wt % to 50 wt % based on a total weight of the non-aqueous electrolyte solution.

13. A lithium secondary battery comprising a positive electrode; a negative electrode; a separator disposed between the positive electrode and the negative electrode; and the non-aqueous electrolyte solution of claim 1.

14. The lithium secondary battery of claim 13, wherein the negative electrode comprises a silicon-based active material.

15. The lithium secondary battery of claim 14, wherein the silicon-based active material comprises at least one selected from metallic silicon (Si), silicon oxide (SiO$_x$, where 0<x<2), silicon carbide (SiC), or a Si—Y alloy, where Y is an element selected from the group consisting of alkali metal, alkaline earth metal, a Group 13 element, a Group 14 element, transition metal, a rare earth element, and a combination thereof, and Y is not Si.

16. The lithium secondary battery of claim 13, wherein the negative electrode further comprises a carbon-based active material.

17. The lithium secondary battery of claim 13, wherein the positive electrode comprises a positive electrode active material selected from Li(Ni₁/₃Mn₁/₃Co₁/₃)O₂, Li(Ni₀.₆Mn₀.₂Co₀.₂)O₂, Li(Ni₀.₅Mn₀.₃Co₀.₂)O₂, Li(Ni₀.₇Mn₀.₁₅Co₀.₁₅)O₂, Li(Ni₀.₈Mn₀.₁Co₀.₁)O₂, or Li(Ni₀.₈₆Co₀.₀₅Mn₀.₀₇Al₀.₀₂)O₂.

* * * * *